Patented June 24, 1930

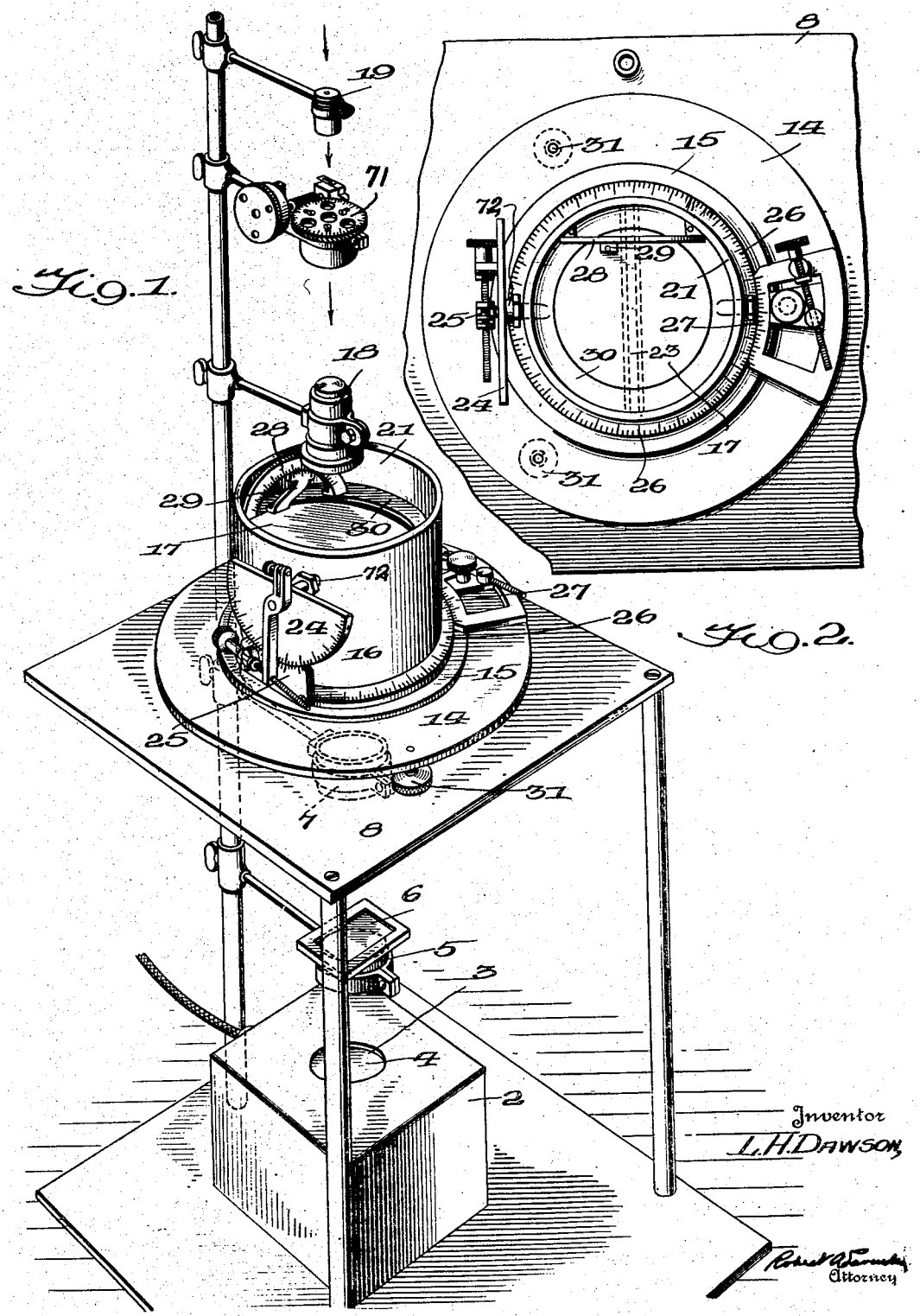

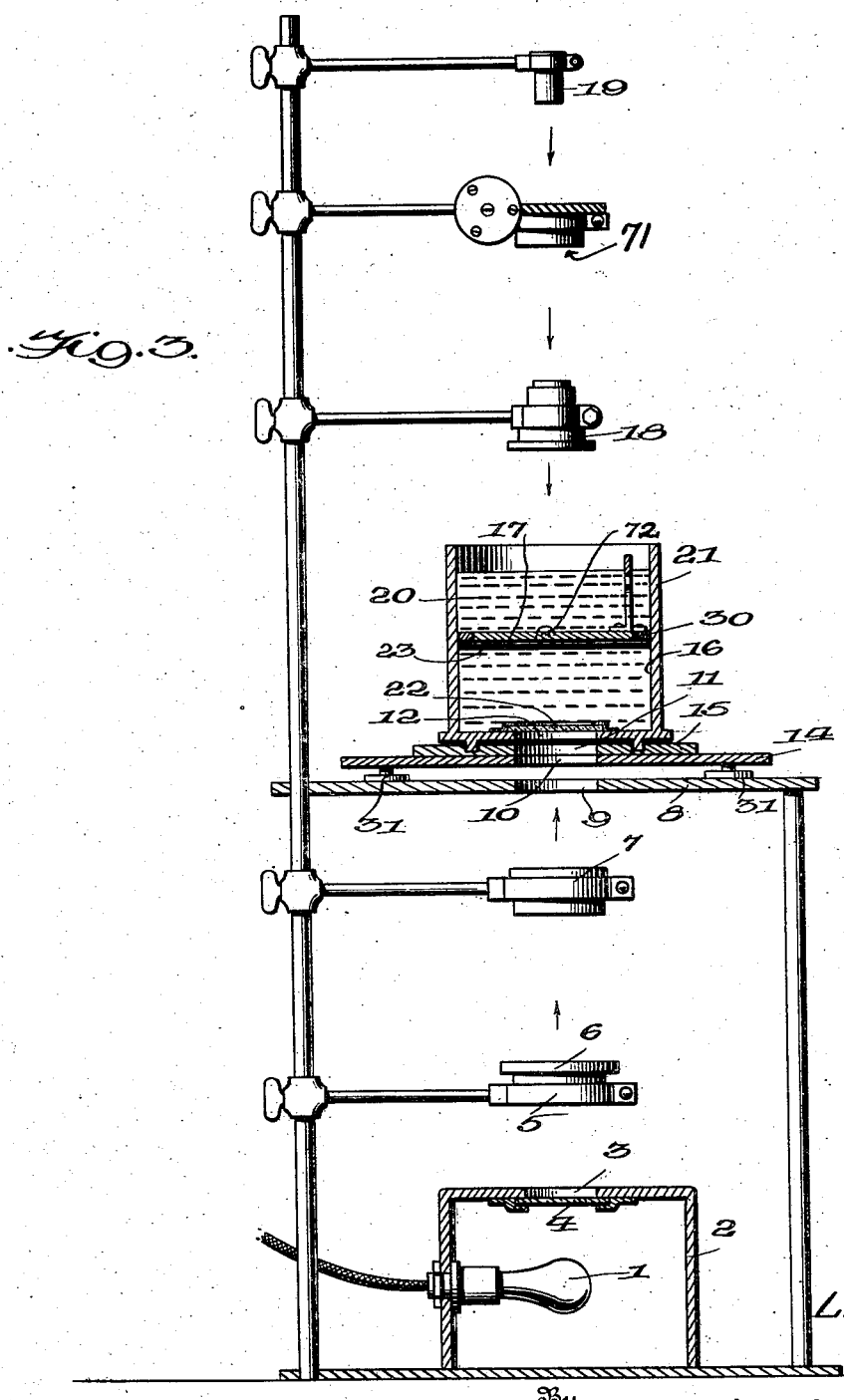

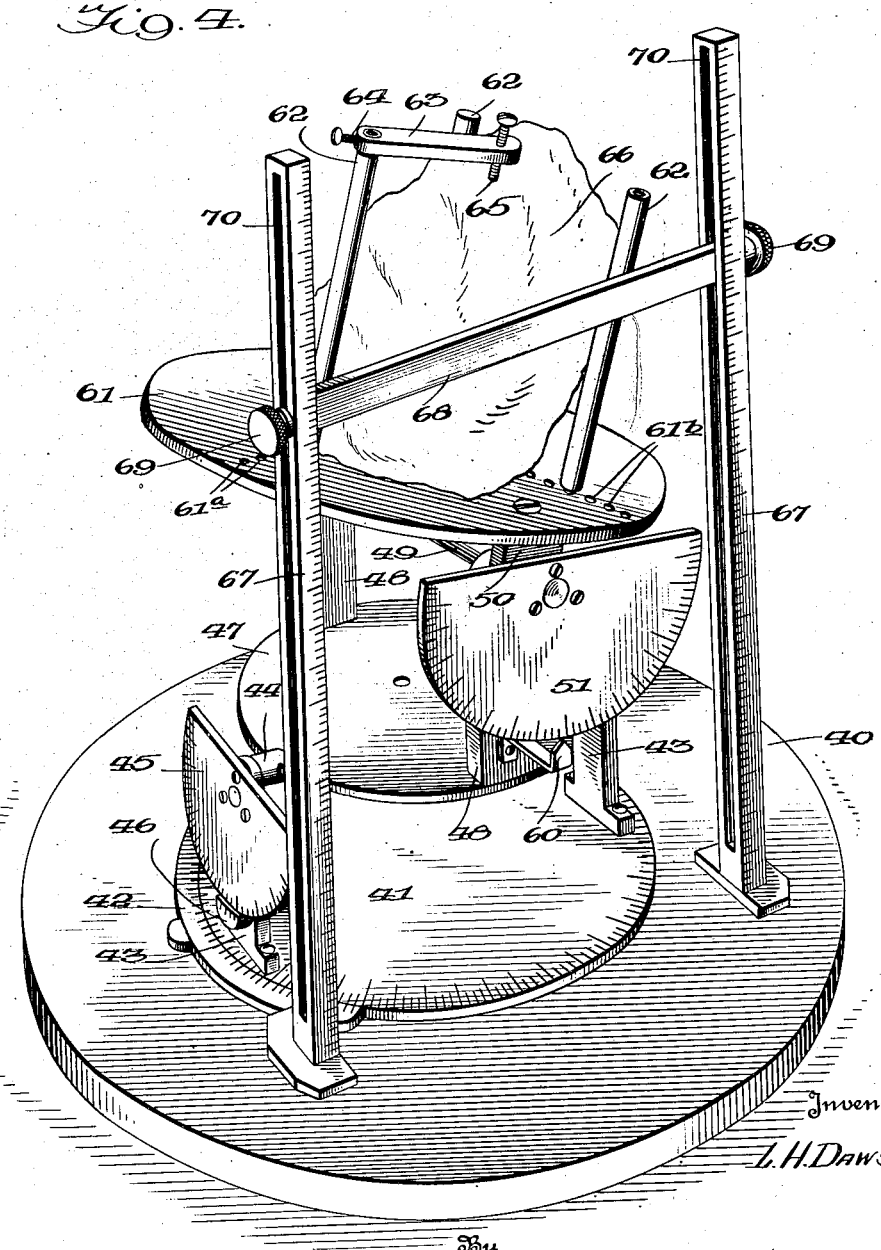

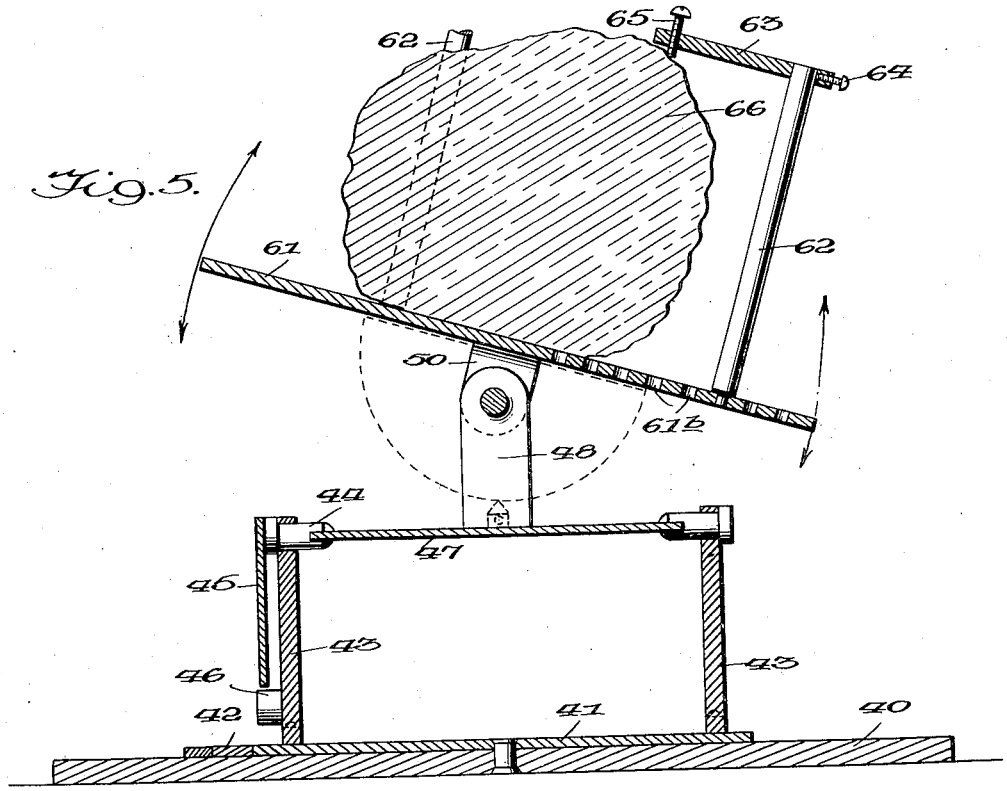
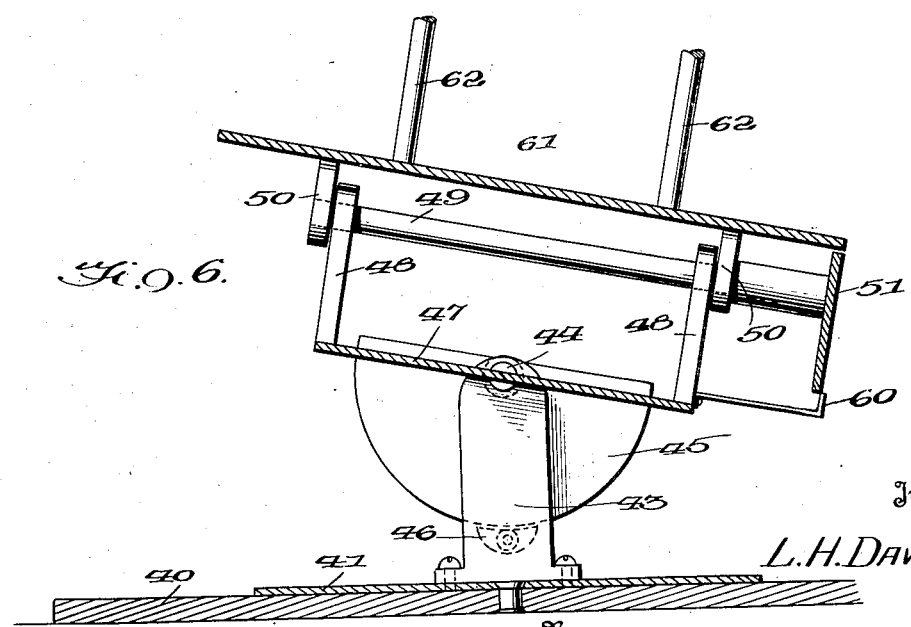

1,766,037

UNITED STATES PATENT OFFICE

LEO H. DAWSON, OF WASHINGTON, DISTRICT OF COLUMBIA, ASSIGNOR, BY MESNE ASSIGNMENTS, TO FEDERAL TELEGRAPH COMPANY, A CORPORATION OF CALIFORNIA

PIEZO-ELECTRIC CRYSTAL APPARATUS

Application filed March 25, 1927. Serial No. 178,354.

My invention relates broadly to optical apparatus and more particularly to an apparatus for the determination of the optical axis of large crystals of quartz.

The object of my invention is to provide apparatus for facilitating the manufacture and production of piezo electric crystal elements for use as frequency control devices in electron tube circuits.

The instrument of my invention was devised to determine the optical axis of pieces of quartz of any size and shape, and surfaces of which are not highly polished. As a rule crystals accommodated by instruments heretofore available for determining the optical axis of crystals must be small and well cut and polished, thus making it impossible to adapt the instrument to the determination of the optical axis of the rough quartz crystals as they come from the mine or of the larger pieces of quartz that have been cut to some regular shape and have roughly ground surfaces.

My invention will be more fully understood from the specification hereinafter following by reference to the accompanying drawings in which:

Figure 1 is a perspective view of an instrument for determining the optic axis of large crystals of quartz by means of the ring system produced by convergent or divergent light rays; Fig. 2 is a plan view of a part of the instrument shown in Fig. 1; Fig. 3 is a schematic view showing the parts of the instrument of Figs. 1 and 2; Fig. 4 shows an instrument for placing lines on the rough quartz perpendicular to the optic axis when the direction of the optic axis is known; and Figs. 5 and 6 are detail views illustrating the construction of the apparatus of Fig. 4.

The instrument comprises a light source such as a 25 watt tungsten lamp 1, Fig. 1, enclosed in a metal case 2 with a circular opening 3 about 10 cm. in diameter in the top. This opening is covered with a ground glass 4 to produce a uniformly illuminated field. The light is rendered plane polarized by the small Nicol prism 5 which is about 10 mm. square and 30 mm. long. Above this is placed a reddish color filter 6. A lens 7 approximately 12 cm. in focal length and 5 cm. in diameter is placed about 10 cm. below the plate 8 and causes the beam to converge, which beam passes through an opening 9 in plate 8, apertures 10, 11 and 12 in plates 14 and 15, and tank or casing 16 respectively, and through the quartz specimen mounted on movable plate 17. A lens 18 is placed about 10 cm. above the top of the quartz and of about 5 cm. focal length is used to produce a small brilliant image of the ring system as will be understood more fully from a consideration of the principles upon which my invention is based. The method of my invention involves passing a ray of convergent or divergent plane-polarized light through a uniaxial double refracting crystal parallel to the optical axis of the crystal. When a cone of rays is observed by means of an analyzing Nicol prism, a system of concentric rings crossed by dark brushes at right angles to one another is seen. These rings may be black and white or colored, depending on whether monochromatic or white light is used. The size of the circles depends upon the angle of convergence of the light. The greater the angle of convergence the smaller the rings, and the thicker the quartz the smaller the rings. This lens is so adjusted that the central ring is about 5 mm. in diameter. Reference character 71 indicates the analyzing Nicol prism. The eyepiece 19 is a small peep hole of about 1 mm. in diameter without a lens and enables the observer to place his eye always in the same position.

Plate 8 contains a circular opening 9 through the center about 12 cm. in diameter. Upon this plate is placed a tank 16 containing oil 20 in which the piece of quartz to be examined is immersed. It has been found desirable to have the bath in which the crystal is immersed to possess approximately the same index of refraction as the quartz. A clear mineral oil has been found to be satisfactory. The tank 16 consists of a metal cylinder 21, five inches in diameter and five inches high with a glass bottom 22. Within this cylinder is a platform 30 that may be rotated about an axis 72 parallel to the bottom of the cylinder. It is controlled from outside the bath by means of the semi-circular scale 24. The plate 24 is graduated and cooperates with a vernier 25 capable of reading to five minutes of arc. The cylinder 16 itself may be rotated as a whole about a vertical axis, the amount of rotation being measured by a scale 26 and vernier 27. The platform 30 carries a plate 17 that may be rotated about an axis 23 in its own plane and at right angles to the axis of the platform 30. The angle of rotation of 17 is measured by the circular scale 28 and vernier 29.

The adjustments of the apparatus are as follows:

The preliminary adjustments of the instrument, without the quartz crystal, consists in the proper alignment of the lenses, prisms, and lamp so that the beam of light passes through the opening in the metal plate supporting the bath of oil and through the bath itself. The lens 18 is adjusted in a vertical direction so that a clear, circular field is seen in the eyepiece 19 and this position must be such that when the quartz to be examined is in position, a clear and distinct image of the quartz is visible. As the pieces of quartz vary in thickness, the same vertical adjustment of the lens 18 may not always bring out a distinct ring system and a slight vertical adjustment of the upper lens must be made in each case.

The rings should be neither too large or too small for if they are too small the center of the inside circle may not be determined accurately and if they are too large the entire inner circle may not be visible with a consequent decrease in the accuracy with which the center of the circle may be found. Furthermore, if they are too large, they will be too weak in intensity to enable one to distinguish accurately the edges of the circles. With the thickness of quartz used, which varied from 1 to 30 mm., it was found most convenient to use a converging beam from lens 7, the angle of convergence of which was about 15°. In extreme cases, very thick or very thin crystals of quartz, a lens of different focal length may be used to advantage.

The lens 18 is fitted with two perpendicular cross-hairs marked on the glass. Their intersection being at the center of the field, the cross-hairs are respectively brought parallel to the axes of revolution of plates 30 and 17.

With vernier 24 and 25 set at zero, the plate 17 is adjusted by means of the leveling screws 31 until its plane is perpendicular to the ray of light from lens 7. Subsequent angles are measured from this position.

A quartz crystal may be described crystallographically as of the "trigonal trapezochechal" crystal of class 18, characterized by three equal crystallographic axes lying in the same (horizontal) plane and inclined at 60 degrees with one another and a fourth (principal) axis perpendicular to the plane of the other three. The three horizontal axes being diagonal and the principal axis being trigonal and also the optic axis of the crystal. Thus the principal axis is parallel to the planes of the six faces of the hexagonal prism of the quartz crystal and lies at an angle of 24° 16' to the six faces of the hexagonal pyramid. There may exist on the faces of a crystal lines of natural growth and these in general lie in a direction perpendicular to the optic axis. Thus when these growth lines are present on at least two of the faces, the direction of the optic axis is immediately determined.

The quartz crystal may exist in two forms, the first of which is capable of rotating the plane of polarization of light to the right and the other of which is capable of rotating the plane of polarization to the left. It is often the case that in specimens of quartz these two forms appear together, having portions of the crystal in common. This phenomenon is known as twining and is objectionable for use in apparatus that requires perfect quartz crystals. The instrument of Figures 4, 5 and 6 by a slight adjustment may be used to test the quartz for twining.

The rough sample in general is not a perfectly developed crystal and may have none of the characteristic features of the quartz crystals. Each piece to be investigated is first examined for traces of growth lines on portions of faces. In the most general cases, where there are no faces visible, three small sections about 3 mm. thick, with faces roughly but not necessarily parallel, are cut in such a manner that their faces are at right angles to one another. How they are cut from the crystal is determined by the size and shape of the crystal. The optical axis of course will lie within 45 degrees to the normal to the surfaces of at least one of these pieces. In the case of a crystal fragment where one face is recognizable, two test sections are cut from the rough piece in such a manner that their planes are mutually perpendicular and at the same time perpendicular to the plane of the face. The optical axis will then lie within 45 degrees to the normal to the surfaces of at least one of the test pieces. In the case where there is a face with a growth line on it, then a small section of the major piece is cut in such a manner that the plane of the section contains the growth line.

Having cut the test sections, the surfaces are smoothed with a fine grade of emery until they become transparent when immersed in oil. The sections are then ready for the measurement of the optical axis.

On each of the test sections is drawn a fine straight line with india ink or other suitable material. The section is placed in the oil tank 16 on the plate 17, in such manner that the line is parallel to the horizontal axis of rotation of member 17. The face of the section contiguous to the plate is opposite to the face that would lie next to the original crystal when the section is fitted back on the crystal in the proper manner. This is very important. The plates are then rotated until the optical axis rings are visible and the scale readings taken.

Having obtained the angles of the optical axis with respect to the perpendicular to the plane of the section, the test section is taken from the oil bath, the surplus oil wiped from the piece, and placed back on the original quartz so that it corresponds to the same position that it had before cutting. It is better to cover the surfaces in contact with glue or shellac before putting them together and allow them to dry. When this has been done, the original piece of quartz with the attached section plate is placed upon the platform 61 of the second piece of apparatus as is shown in Figs. 4, 5 and 6 in such position that the line drawn on the section plate is again parallel to the horizontal axis of rotation of plate 61 and lies in the same direction as it was in the oil bath.

The platform 61 is capable of being rotated about two axes at right angles to one another reproducing the same motion that the platform 17 in the oil bath 20 is capable of undergoing (see Figs. 1, 2 and 3). The angles previously read in the oil bath are turned off on the proper scales, care being taken to turn them off in the same direction. The goniometer is mounted upon the supporting base 40 to which is secured a circular scale member 42 against which the disc scale 41 abuts in such manner that it may be rotated to different positions for selecting different settings for the apparatus. The disc 41 carries standards 43 which provide trunnions 44 for the pivotal mounting of plate 47. A semi-circular scale 45 is secured to the rotatable axis of plate 47 and this is aligned with the vernier scale 46 on standard 43. The plate 47 is free to be moved to various angular positions and set in position by the alignment of the scale 45 with the vernier scale 46. Standards 48 are carried by the plate 47 and these provide bearings at their upper extremities for the shaft member 49, to which is secured the plate member 61 by means of depending lug members 50. The scale 51 is secured to the shaft 49 and cooperates with an index 60 for determining the angular setting of the plate 61. The plate 61 is therefore angularly movable in a direction at right angle to the direction of movement of plate 47. Plate 61 is provided with apertures 61ª and 61ᵇ in which the posts 62 may be set for confining the quartz 66 to a position upon the plate 61. Arm members 63 may be adjustably secured by means of screw device 64 to the posts 62 and adjusting screws 65 bear down upon the quartz 66 for anchoring it solidly in position for permitting the proper markings to be made thereon. The plates of the instrument are then clamped. The feet 67 of the vertical scale 70 are placed upon the base plate 40 and the cross bar 68 is adjusted by means of thumb screws 69 until it is parallel to the base plate 40 and in such a position as to enable one to draw marks upon the surface of the piece of quartz 66 parallel to the top of the cross bar. The horizontal bar 68 is placed against the quartz 66 and a fine line drawn with a ruling pen and drawing ink. The bar is shifted to another position by loosening and tightening thumb screws 69 and a second mark is made taking care that it is not parallel to the first. The rough piece of quartz may then be taken from the plate and oriented upon a suitable saw bed in such a position that the plane of the saw cut will be parallel to the plane determined by the two lines drawn on the quartz. The plane of the saw cut will be perpendicular, within the error of the instrument, to the optical axis of the quartz. The piece may then be cut into slabs of any desired thickness. If the quartz is to be cut at an angle to the optical axis then the angles turned off on the respective scales must be those read in the oil bath increased by the angle at which the optical axis is to lie to the perpendicular to the quartz surface.

The instrument can readily be used to obtain the optic-axial angle of crystals of any size or shape that can be accommodated by the tank 16. For securing observations as to the extinction planes, a vernier adjustable Nicol prism may be provided at 71. In particular cases the entire central ring of the system may not be visible as in the case of thin slabs of quartz of a millimeter or less in thickness and in which the optic axis lies in the plane of the slab. It is necessary in such cases to estimate the center of the ring.

In the case of crystals that are cut into slabs, the edges of which lies in the plane of the which the optic axis lies in the plane of the slab, an extinction method is the most convenient. This method is based upon the principle that when a ray of light from a polarizing Nicol prism falls on a double refracting substance like quartz perpendicular to the optic axis, the ray is broken up into two planes polarized rays at right angles to each other. One of these planes will contain the optic axis. Consequently, when these rays are viewed with an analyzing Nicol prism the plane of which is at right angles to the plane of the polarizer there will be four positions of extinction as the quartz is rotated about an axis perpendicular to its plane.

These positions will be 90° apart and will occur when the planes of polarization of the ray from the quartz are at right angles to the planes of the analyzer and polarizer.

A reference line is drawn on the surface of the crystal and aligned parallel to one of the cross-wires of the instrument and the reading taken on the horizontal scale G. The immersion tank is rotated until the position of extinction is observed. The scale readings are again taken. The specimen may then be taken from the oil and the direction of the optic axis with the reference line be determined by means of a protractor.

The instrument may also be used to test quartz crystals for twining. To do this, the quartz is placed on plate 17 and adjusted until the optic axial rings are visible. The lens 18 is then pushed aside. In this position the presence of twining is detected by brilliantly colored areas of irregular shape. The quartz may then be moved about on plate 17 until the entire surface has been examined.

The apparatus of my invention permits the manufacture of piezo electric crystals on a quantity basis. Quartz may be tested with fair rapidity for determining the proper planes on which cuts may be made and thereafter proper identification marks may be placed upon the quartz in order that the cutting tool may be operated in the proper direction.

While I have described my invention in certain preferred embodiments, I desire that it be understood that modifications may be made and that no limitations upon my invention are intended other than are imposed by the scope of the appended claims.

What I claim as new and desire to secure by Letters Patent of the United States is as follows:

1. Apparatus for determining the cutting planes for piezo electric crystals from bodies of quartz comprising a tank rotatable about a vertical axis, a platform pivotally mounted on a horizontal axis within said tank, a central axis substantially normal to said first mentioned axis, scale members for determining the rotative movement of said tank and the angular disposition of said platform and central section, said central section being arranged to support a test section of quartz and optical means aligned with said vertical axis of said tank for observing said test section of quartz.

2. Apparatus for determining the cutting planes for piezo electric crystals from a body of quartz comprising a fluid tank rotatable about a vertical axis, a platform pivotally mounted within said fluid tank and arranged to be moved to selected angular positions, a central section pivotally mounted on said platform, optical means aligned with the vertical axis of said tank for observing a test section of quartz disposed on said central section and scale members for independently observing the displacement of said tank, said platform and said central section for indicating the planes of polarization of said test section of quartz.

3. Apparatus for determining the planes for cutting piezo electric crystals from bodies of quartz comprising a fluid tank rotatable about a vertical axis with respect to a fixed scale member, a platform pivotally mounted along a horizontal axis within said tank, a central section pivotally mounted with respect to said platform along an axis normal to the pivotal mounting of said platform, optical means mounted along the vertical axis of said tank for observing the planes of polarization of a test section of quartz mounted upon the said central section, scale members for indicating the angular displacement of said tank, said platform and said central section, for selecting positions of said test section of quartz in accordance with observations by said optical means.

4. The method of preparing quartz crystals from a body of quartz which consists in observing the polarization planes of a body of quartz, measuring the angular position of the polarization planes of said quartz body with respect to a given reference plane and marking said quartz body in lines extending perpendicular to the optical axis thereof for the purpose of cutting piezo electric elements therefrom.

5. The method of preparing electric crystal elements from a body of quartz which consists in observing the planes of polarization of a quartz body, measuring the position of the quartz body with respect to a given reference plane while under observation, removing said quartz body from the position of observation, mounting said quartz body in a position similar to the position thereof during time of observation and marking said quartz body in a second position in lines extending perpendicular to the optical axis thereof for the cutting of piezo electric crystal elements therefrom.

6. The method of preparing piezo electric crystal elements from a body of quartz which consists in observing the planes of polarization of the quartz measuring the position of the quartz with respect to a given reference plane, mounting the quartz in a position similar to the observating position in lines extending perpendicular to optical axis thereof and marking the quartz in said second position for the cutting of piezo electric crystal elements therefrom.

7. The method of preparing piezo electric crystal elements from a body of quartz which consists in mounting a specimen of quartz in a position for optical observation, determining the planes of polarization of said specimen, measuring the angular position of said specimen with respect to a fixed reference plane, removing the specimen from the position of observation, locating the specimen in an angular position similar to the position of the specimen under the conditions of observation and marking the quarts in lines extending perpendicular to the optical axis thereof for the cutting of piezo electric crystal elements therefrom.

8. The method of preparing piezo electric elements from bodies of quartz which consists in optically observing the planes of polarization of said quartz, measuring the angular position of the quartz with reference to a plurality of given reference planes, removing the quartz to a marking position similar to the position occupied by the quartz during conditions of observation with respect to the same reference planes and marking the quartz in lines extending perpendicular to the optical axis thereof preparatory to the cutting of specimens therefrom.

LEO H. DAWSON.